United States Patent
Shiflet

(10) Patent No.: US 9,310,815 B2
(45) Date of Patent: Apr. 12, 2016

(54) SETPOINT ADJUSTMENT-BASED DUTY CYCLING

(71) Applicant: Tendril Networks, Inc., Boulder, CO (US)

(72) Inventor: Eric M. Shiflet, Boulder, CO (US)

(73) Assignee: Tendril Networks, Inc., Boulder, CO (US)

( * ) Notice: Subject to any disclaimer, the term of this patent is extended or adjusted under 35 U.S.C. 154(b) by 459 days.

(21) Appl. No.: 13/765,623

(22) Filed: Feb. 12, 2013

(65) Prior Publication Data

US 2014/0229016 A1   Aug. 14, 2014

(51) Int. Cl.
*G05D 23/19* (2006.01)
*G06Q 10/06* (2012.01)
*F24F 11/00* (2006.01)

(52) U.S. Cl.
CPC ............ *G05D 23/1923* (2013.01); *G06Q 10/06* (2013.01); *F24F 11/0012* (2013.01)

(58) Field of Classification Search
USPC ........................................................ 700/276
See application file for complete search history.

(56) References Cited

U.S. PATENT DOCUMENTS

| | | | |
|---|---|---|---|
| 5,179,556 A | 1/1993 | Turner |
| 5,572,438 A | 11/1996 | Ehlers et al. |
| 5,684,710 A | 11/1997 | Ehlers et al. |
| 5,696,695 A | 12/1997 | Ehlers et al. |
| 5,719,861 A | 2/1998 | Okanoue |
| 5,865,991 A | 2/1999 | Hsu |
| 5,924,486 A | 7/1999 | Ehlers et al. |
| 5,949,976 A | 9/1999 | Chappelle |
| 5,959,529 A | 9/1999 | Kail, IV |
| 6,028,857 A | 2/2000 | Poor |
| 6,092,207 A | 7/2000 | Kolinski et al. |
| 6,178,362 B1 | 1/2001 | Woolard et al. |
| 6,208,247 B1 | 3/2001 | Agre et al. |
| 6,216,956 B1 | 4/2001 | Ehlers et al. |
| 6,631,309 B2 | 10/2003 | Boies et al. |
| 6,640,248 B1 | 10/2003 | Jorgensen |
| 6,680,922 B1 | 1/2004 | Jorgensen |

(Continued)

FOREIGN PATENT DOCUMENTS

| | | |
|---|---|---|
| WO | WO-0074306 | 12/2000 |
| WO | WO-2012068503 | 5/2012 |

OTHER PUBLICATIONS http://www.diykyoto.com/, accessed on Aug. 9, 2010.

(Continued)

*Primary Examiner* — Carlos Ortiz Rodriguez
(74) *Attorney, Agent, or Firm* — Perkins Coie LLP

(57) ABSTRACT

A facility for performing setpoint adjustment-based duty cycling techniques by adjusting the setpoint of a device or component is described. The facility reduces energy consumption for a system, such as an HVAC system, or device by adjusting or modulating an associated setpoint or temperature setting. The facility modulates the setpoint between a base setpoint value and another setpoint value based on a mode of the system. When the system is in a cooling mode, the facility modulates the temperature between the base setpoint value and a higher setpoint value. When the system is in heating mode, the facility modulates the temperature between the base setpoint value and a lower setpoint value. The facility may modulate the setpoint between the two setpoint values based on an offset value or a fixed setpoint value.

20 Claims, 9 Drawing Sheets

(56) References Cited

U.S. PATENT DOCUMENTS

| | | |
|---|---|---|
| 6,684,339 B1 | 1/2004 | Willig |
| 6,785,592 B1 | 8/2004 | Smith et al. |
| 6,859,831 B1 | 2/2005 | Gelvin et al. |
| 6,947,483 B2 | 9/2005 | Engwer |
| 7,058,657 B1 | 6/2006 | Berno |
| 7,062,389 B2 | 6/2006 | Johnson et al. |
| 7,130,719 B2 | 10/2006 | Ehlers et al. |
| 7,171,287 B2 | 1/2007 | Weiss |
| 7,245,947 B2 | 7/2007 | Salokannel et al. |
| 7,263,450 B2 | 8/2007 | Hunter |
| 7,266,428 B2 | 9/2007 | Alexanian |
| 7,302,634 B2 | 11/2007 | Lucovsky |
| 7,333,821 B2 | 2/2008 | Willey |
| 7,356,548 B1 | 4/2008 | Culp et al. |
| 7,505,852 B2 | 3/2009 | Board |
| 7,552,033 B1 | 6/2009 | Culp et al. |
| 8,176,095 B2 | 5/2012 | Murray et al. |
| 8,239,046 B2 | 8/2012 | Koehler et al. |
| 2002/0002636 A1 | 1/2002 | Vange et al. |
| 2002/0071398 A1 | 6/2002 | Moran et al. |
| 2003/0069970 A1 | 4/2003 | Kim et al. |
| 2003/0190912 A1 | 10/2003 | Jampolsky et al. |
| 2004/0117330 A1 | 6/2004 | Ehlers et al. |
| 2004/0133314 A1 | 7/2004 | Ehlers et al. |
| 2004/0138981 A1 | 7/2004 | Ehlers et al. |
| 2004/0139038 A1 | 7/2004 | Ehlers et al. |
| 2004/0249515 A1 | 12/2004 | Johnson et al. |
| 2004/0260411 A1 | 12/2004 | Cannon |
| 2004/0262410 A1 | 12/2004 | Hull |
| 2005/0038571 A1 | 2/2005 | Brickfield et al. |
| 2005/0043829 A1 | 2/2005 | Rossides |
| 2005/0096060 A1 | 5/2005 | Rajkotia et al. |
| 2005/0096857 A1 | 5/2005 | Hunter |
| 2005/0124358 A1 | 6/2005 | Willey |
| 2005/0157723 A1 | 7/2005 | Kim et al. |
| 2006/0200542 A1 | 9/2006 | Willig |
| 2006/0209789 A1 | 9/2006 | Gupta et al. |
| 2007/0043477 A1 | 2/2007 | Ehlers et al. |
| 2007/0043478 A1 | 2/2007 | Ehlers et al. |
| 2007/0097993 A1 | 5/2007 | Bojahra et al. |
| 2007/0174644 A1 | 7/2007 | Willig |
| 2007/0251461 A1 | 11/2007 | Reichard et al. |
| 2008/0129495 A1 | 6/2008 | Hitt |
| 2008/0263196 A1 | 10/2008 | Kansal et al. |
| 2008/0306985 A1 | 12/2008 | Murray et al. |
| 2009/0007706 A1 | 1/2009 | Hitt et al. |
| 2009/0045256 A1 | 2/2009 | McInerney et al. |
| 2009/0059842 A1 | 3/2009 | Maltseff et al. |
| 2010/0010678 A1 | 1/2010 | Dawson et al. |
| 2010/0031324 A1 | 2/2010 | Strich et al. |
| 2010/0042453 A1 | 2/2010 | Scaramellino et al. |
| 2010/0070101 A1 | 3/2010 | Benes et al. |
| 2010/0070102 A1 | 3/2010 | Benes et al. |
| 2011/0166710 A1 | 7/2011 | Kordik et al. |
| 2012/0029717 A1* | 2/2012 | Cox et al. ............ 700/295 |
| 2012/0323637 A1 | 12/2012 | Cushing et al. |
| 2013/0013121 A1 | 1/2013 | Henze et al. |

OTHER PUBLICATIONS http://www.theenergydetective.com/home, accessed on Aug. 9, 2010.
http://www.bluelineinnovations.com, accessed on Aug. 9, 2010.
http://www.theowl.com/, accessed on Aug. 9, 2010.
http://www.ambientdevices.com/products/energyjoule.html, accessed on Aug. 9, 2010.
http://hes.lbl.gov/consumer, accessed on Aug. 9, 2010.
http://www.greenenergyoptions.co.uk/, accessed on Aug. 9, 2010.
http://onzo.com/solutions/, accessed on Aug. 9, 2010.
http://www.opower.com/Products/Overview.aspx, accessed on Aug. 9, 2010.
http://www.alertme.com/, accessed on Aug. 9, 2010.
http://silverspringnetworks.com/products/index.html, accessed on Aug. 9, 2010.
http://www.agilewaves.com/, accessed on Aug. 9, 2010.
http://www.energyhub.net, accessed on Aug. 9, 2010.
http://www.tendrilinc.com/products/vision/,accessed on Aug. 9, 2010.
http://www.powermand.com/dreamwatts-product, accessed on Aug. 9, 2010.
http://www.energy-aware.com/, accessed on Aug. 9, 2010.
http://www.consert.com/, accessed on Aug. 9, 2010.
http://www.lem.com/hq/en/content/view/276/215/, accessed on Aug. 9, 2010.
http://www.google.com/powermeter/about/, accessed on Aug. 9, 2010.
http://blog.microsoft-hohm.com/Hohm-energy-report-sample.aspx, accessed on Aug. 9, 2010.
http://efficiency20.com/, accessed on Aug. 9, 2010.
Retzlaff et al. Conservation & Energy Potential Study for Smith River Rancheria:, Smith River Rancheria, Evergreen NRG/Strategic Energy Solutions, Aug. 2005, 417 pages.
U.S. Appl. No. 61/446,233; Inventor: Henze; filed Feb. 24, 2011, 17 pages.
Kennedy, James and Russell Eberhart. "Particle Swarm Optimization," Proceedings of the IEEE International Conference on Neural Networks (Perth, Australia), 1995, pp. 1942-1948.
Doebber, I."Investigation of Concrete Wall Systems for Reducing Heating nad Cooling Requirements in Single Family Residences" [online], Sep. 2004 [retrieved on Mar. 9, 2014]. Retrieved from the Internet<URL: http://scholar.lib.vt.edu/theses/available/etd-10262004-21448/unrestricted/FinalThesis.pdf>.
International Search Report and Written Opinion; International Application No. PCT/US2011/061470; mailed Apr. 9, 2014; 9 pages.

\* cited by examiner

SETPOINT ADJUSTMENT-BASED DUTY CYCLING

BACKGROUND

Heating, Ventilation, and Air Conditioning (HVAC) systems are used in buildings, automobiles, and other environments to regulate environmental conditions such as temperature, humidity, airflow, and so on. Because typical HVAC systems are often comprised of a number of high energy consumption components, such as heating units, ventilation systems/architectures, air conditioners/cooling units, and so on, HVAC systems typically represent a large source of energy consumption. As such, many utility companies and consumers desire to reduce the amount of energy consumed by HVAC systems.

In some environments, a utility company will impose demand response schemes to encourage or force customers to reduce their consumption at certain times (e.g., times of day when there is typically a high demand for energy). For example, a utility company may increase the cost of energy during these times or imposing/adjusting a duty cycle for various appliances by switching off (and on) components of the system without regard to the thermostat controller. Thus, the HVAC system, or some component thereof, may be regularly shut off for some period of time (e.g., 10 minutes, 30 minutes, an hour) to reduce energy consumption. In this manner, energy consumption may be reduced, but the users of the HVAC system are subjected to a demand response scheme that does not take into account user preferences with respect to temperature, humidity, airflow, and other environmental factors.

DETAILED DESCRIPTION

Figure 1:
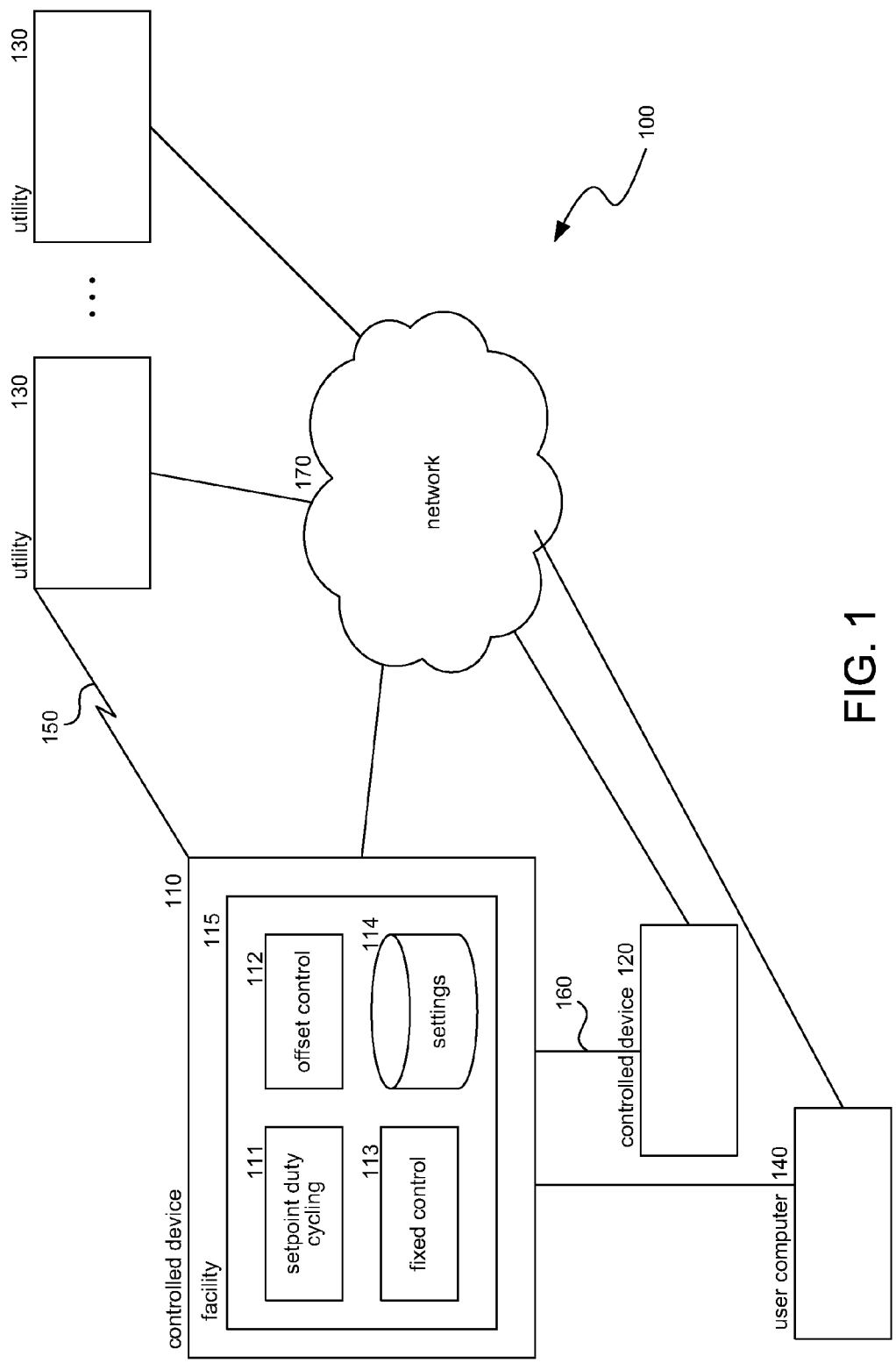
FIG. 1 is a block diagram illustrating an environment in which the facility may operate.

A facility for performing setpoint adjustment-based duty cycling techniques by adjusting the setpoint of a device or component is described. In some embodiments, the facility operates in conjunction with an HVAC system to reduce the amount of energy that the HVAC system consumes by adjusting or modulating a setpoint or temperature setting associated with the HVAC system, such as a thermostat setpoint, based on a current mode of the HVAC system (e.g., a heating mode or a cooling mode). In response to receiving an indication of a duty cycling event, such as a demand response event requesting or requiring a reduction in energy consumption and specifying a duration and a cycle period, the facility determines a current or base setpoint value for the HVAC system (e.g., a setpoint based on user preferences, such as 70 degrees Fahrenheit or 22 degrees Celsius) and a current mode for the HVAC system. During the duty cycling event, the facility modulates the setpoint between the base setpoint value and another setpoint value based on the mode of the HVAC system. When the HVAC system is in cooling mode, for example, the facility modulates the temperature between the base setpoint value and another setpoint value that is higher than the base setpoint value. When the HVAC system is in heating mode the facility modulates the temperature between the base setpoint value and another setpoint value that is lower than the base setpoint value.

In some embodiments, the facility modulates the setpoint between two setpoint values at regular intervals based on an offset value established, for example, by the utility or a user of the HVAC system. For example, if the HVAC system is in cooling mode the facility modulates a setpoint between the base setpoint value and a higher setpoint value to reduce the amount of energy consumed by the HVAC system. For example, the facility may apply a 4° F. offset so that the setpoint is modulated between a base setpoint value of, for example, 68° F. and an offset setpoint value of 72° F. (68° F.+4° F.) over the course of a specified duration, such as 30 minutes, 1 hour, 2 hours, etc. In this manner, while the setpoint is set to 72° F. in cooling mode the HVAC system will not attempt to cool the environment below 72° F. and, therefore, will not consume the additional energy to cool the environment to below 72° F. By modulating the setpoint between the base setpoint value and the offset setpoint value at regular intervals (e.g., 15 minutes, 20 minutes, 30 minutes) over the course of the specified duration, energy consumption is reduced compared to an HVAC system with a thermostat that is set to 68° F. over the course of the specified duration because when the thermostat is set to 68° F. the HVAC system will attempt to cool the environment to 68° F. A similar approach may be applied to an HVAC system in heating mode by modulating a setpoint between a base setpoint value and a lower setpoint value to reduce the amount of energy consumed by the HVAC system. In some embodiments, the facility may modulate the setpoint between the two setpoint values at irregular or varying intervals.

In some embodiments, the facility modulates the setpoint between the two setpoint values at regular intervals based on a fixed setpoint value established, for example, by the utility or a user of the HVAC system. For example, if the HVAC system is in heating mode the facility may modulate a setpoint between the base setpoint value and a preprogrammed or fixed lower setpoint value to reduce the amount of energy consumed by the HVAC system. For example, the facility may use a fixed setpoint (e.g., 68° F.) so that the setpoint is modulated between a base setpoint value of, for example, 70° F. and the fixed setpoint value of 68° F. over the course of a specified duration. In this manner, while the setpoint is set to 68° F. in heating mode the HVAC system will not attempt to heat the environment to above 68° F. and, therefore, will not consume the additional energy to heat the environment to above 68° F. By modulating the setpoint between the base setpoint value and the fixed lower setpoint value over the course of the specified duration, energy consumption is reduced compared to an HVAC system with a thermostat that is set to 70° F. over the course of the specified duration because when the thermostat is set to 70° F. the HVAC system will attempt to heat the environment to above 68° F. A similar approach may be applied to an HVAC system in cooling mode by modulating a setpoint between a base setpoint value and a higher fixed setpoint value during some length of time to reduce the amount of energy consumed by the HVAC system over the length of time. In some embodiments, the facility may modulate the setpoint between the two setpoint values at irregular or varying intervals.

FIG. 1 is a block diagram illustrating an environment 100 in which the facility may operate in some embodiments. In this example, the environment 100 comprises controlled device 110, controlled device 120, utilities 130, user computer 140, and network 170. Controlled device 110 comprises facility 115, which is comprised of setpoint duty cycling component 111, offset control component 112, fixed control component 113, and settings store 114. Controlled device 110 represents a device, such as a thermostat of an HVAC system, configured to be regulated by a setpoint duty cycling component stored on the controlled device. Setpoint duty cycling component 111 is invoked in response to a duty cycling event and modulates a setpoint associated with a controlled device between two setpoint values. Offset control component 112 is invoked by the setpoint duty cycling component to modulate a setpoint associated with a controlled device between a base setpoint value and another setpoint value based on an offset value. Fixed control component 113 is invoked by the setpoint duty cycling component to modulate a setpoint associated with a controlled device between a base setpoint value and a fixed setpoint value. Settings store 114 stores settings for controlled devices and parameters for duty cycling events, such as base setpoint values, offset values, fixed setpoint values, durations for duty cycling events, periods for duty cycling events, and so on. Controlled device 120 represents a device configured to be regulated by a setpoint duty cycling component that is stored on another device, such as controlled device 110 or user computer 140. Controlled device 120 may represent a device with limited processing or storage capabilities that leverages resources of another device. Utilities 130 represent utility providers, such as an electric company or a gas company. In some embodiments utilities 130 transmit parameters to a controlled device or user computer, such as settings for controlled devices and parameters for duty cycling events. In this example a controlled device may communicate with utilities 130 via network 170 or connection 150. Furthermore, controlled devices 110 and 120 may communicate via connection 160. In some embodiments, a user may establish settings for controlled devices via user computer 140 and/or directly through an interface provided by a controlled device.

The computing devices on which the disclosed facility is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the technology, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

The disclosed facility may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display, LCD, LED display, OLED display, and so on.

The technology can also be practiced in distributed environments, where tasks or modules are performed by remote processing devices linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the technology.

Figure 2:
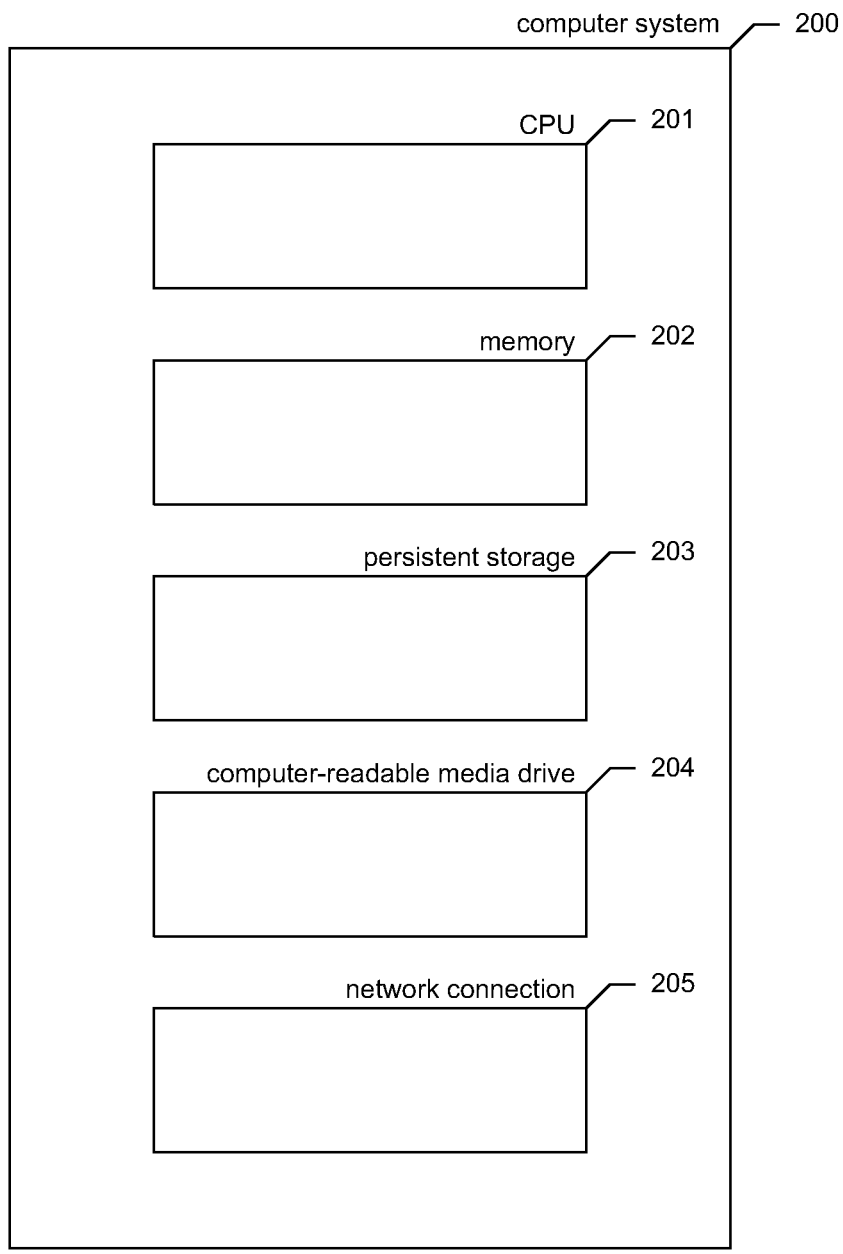
FIG. 2 is a block diagram showing some of the components incorporated in computing systems associated with the facility.

FIG. 2 is a block diagram showing some of the components incorporated in computing systems associated with the facility, such as a controlled device, a user computer, or a utility, in some embodiments. Computer system 200 comprises one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are preferably used to support the operation of the facility, those skilled in the art will appreciate that the facility may be implemented using devices of various types and configurations.

Figure 3:
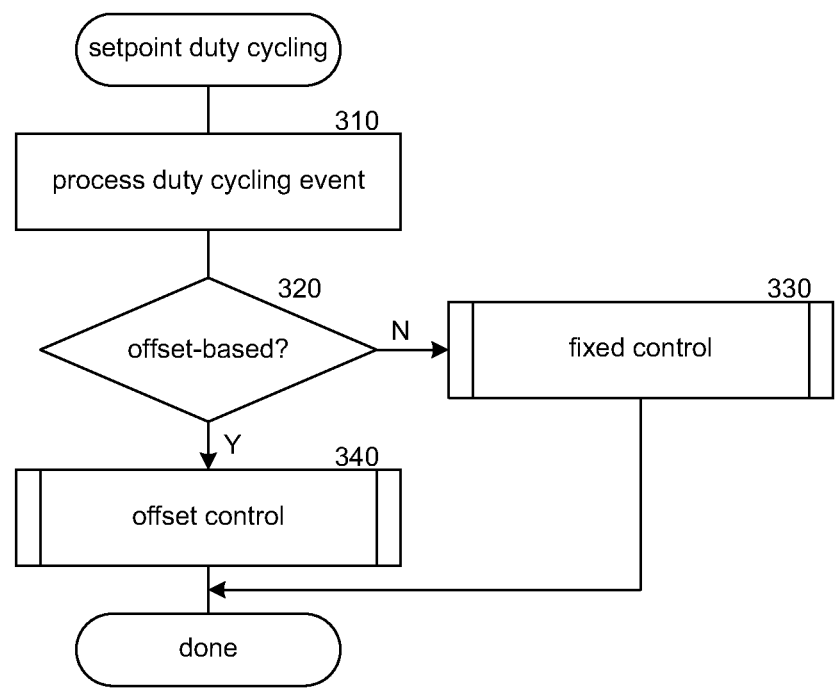
FIG. 3 is a block diagram illustrating the processing of a setpoint duty cycling component.

FIG. 3 is a block diagram illustrating the processing of a setpoint duty cycling component in some embodiments. The setpoint duty cycling component is invoked by a controlled device in response to a demand response request specifying a duty cycling event, such as a request to conserve power by duty cycling for an hour long period. In block 310, the component processes the duty cycling event by, for example, determining whether the duty cycling event is offset-based or fixed, determining the duration of the duty cycling event, determining the period of the duty cycling event, and so on. In decision block 320, if the duty cycling event is offset-based, then the component continues at block 340, else the component continues at block 330. In block 330, the component invokes a fixed control component and then completes. In block 340, the component invokes an offset control component and then completes. In some cases, the duty cycling event may have an associated start time. In these case, the component may not invoke the fixed control component or the offset control component until the associated start time.

Figure 4:
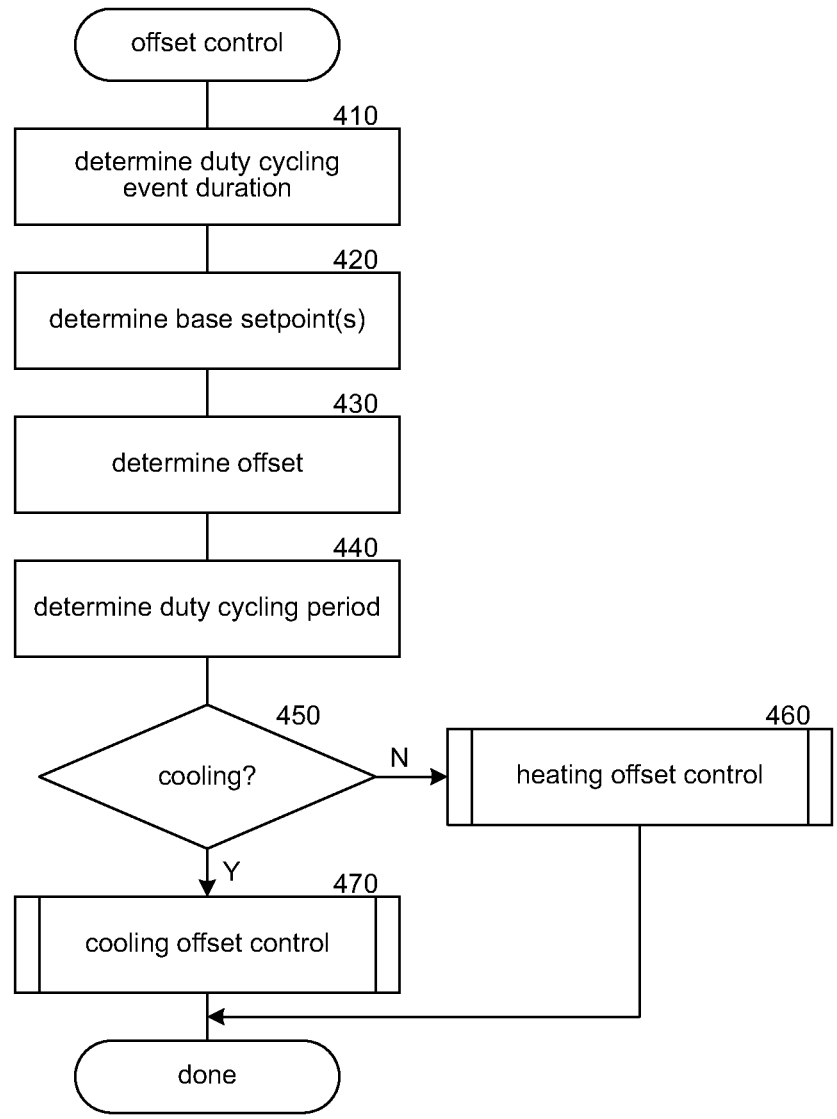
FIG. 4 is a block diagram illustrating the processing of an offset control component.

FIG. 4 is a block diagram illustrating the processing of an offset control component in some embodiments. The offset control component is invoked by a setpoint duty cycling component to modulate a setpoint of a controlled device between two setpoint values based on a base setpoint value and an offset value. In block 410, the component determines the duration of the duty cycling event based on, for example, specifications of a demand response request. In block 420, the component determines a base setpoint value, such as the current setpoint value of a thermostat. In some embodiments, the component may determine multiple base setpoint values based on a schedule that overlaps with the duty cycling event. For example, if a demand response request specifying a duty cycling event with a duration of one hour is received at 4:00 pm and a thermostat to be controlled is programmed to a setpoint value of 60° F. from noon to 4:30 pm and a setpoint value of 68° F. from 4:30 pm to 9:00 pm, then the component will determine a first base setpoint value of 60° F. to be used by the component from 4:00 pm to 4:30 pm and a second base setpoint value of 68° F. to be used by the component from 4:30 pm to 5:00 pm. In block 430, the component determines an offset value to be applied during the duty cycling event. The offset value may be stored in and retrieved from the settings stored or may be received with a demand response request. In some cases, the component may query the appropriate utility for one or more offset values. In some embodiments, a utility may offer different energy rates for different offset values and the component may select an offset based on the user's willingness (or unwillingness) to conserve energy. In some cases, the component may prompt the user to select from a group of offset values and associated energy rates (e.g., price per watt) and receive a selection of an offset from the user. In block 440, the component determines the period of the duty cycling event. The period of the duty cycling event corresponds to the amount of time between successive high (or low) setpoint values. Thus, the period of the duty cycling event represents the length of a cycle in the duty cycling event or the inverse of a frequency of the duty cycling event. The number of cycles during a duty cycling event can be determined by dividing the duration of the duty cycling event by the period of the duty cycling event. For example, a duty cycling event of two hours (120 minutes) with a period of 30 minutes will have 4 (120/30) cycles. The period of the duty cycling event may be specified by the demand response request, retrieved from a utility, or preprogrammed into a controlled device. In decision block 450, if the controlled device is in cooling mode, then the component continues at block 470, else the component continues at block 460. In block 460, the component invokes a heating offset control component and then completes. In block 470, the component invokes a cooling offset control component and then completes.

Figure 5:
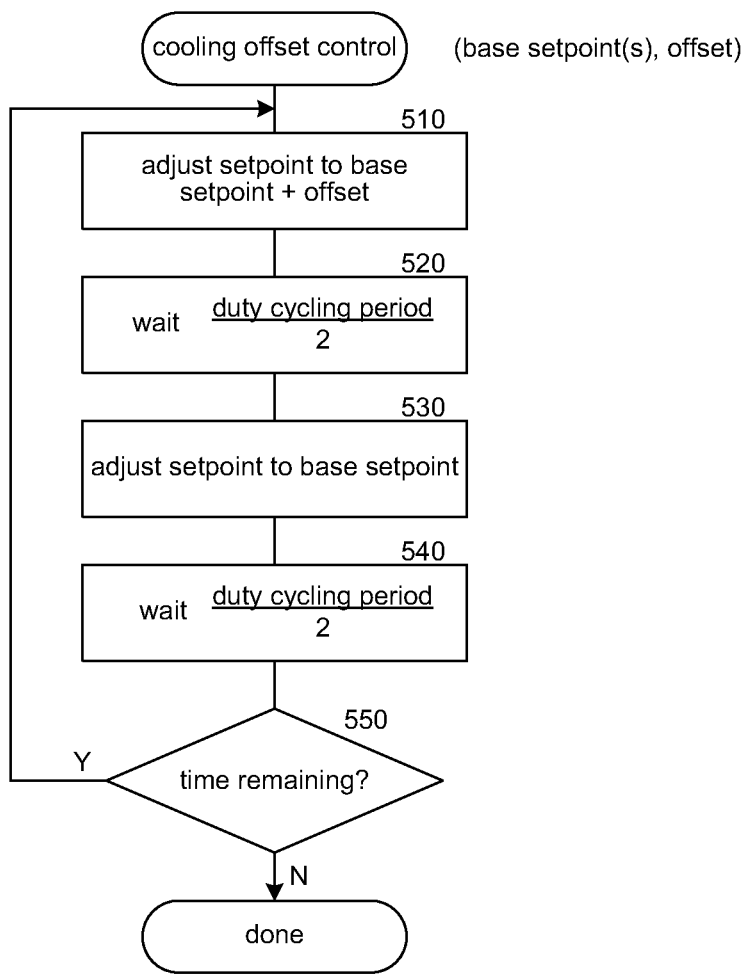
FIG. 5 is a block diagram illustrating the processing of a cooling offset control component.

FIG. 5 is a block diagram illustrating the processing of a cooling offset control component in some embodiments. The cooling offset control component is invoked by an offset control component to modulate a setpoint based on one or more base setpoint values and an offset value while a controlled device is in a cooling mode. In block 510, the component adjusts the setpoint to a base setpoint value plus the offset value. For example, if the base setpoint value is 66° F. and the offset value is 6° F., then the component would adjust the setpoint to 72° F. (66° F.+6° F.). The component may select from among multiple base setpoint values to comply with any scheduled changes to account for programmed settings, etc. In block 520, the component waits for half of the duty cycle period. For example, if the duty cycle period is 30 minutes, then the component will wait for 15 minutes. In block 530, the component adjusts the setpoint to a base setpoint value. As discussed above, if there are multiple base setpoint values, then the component selects the appropriate base setpoint value based on an associated setpoint schedule. In block 540, the component waits for half of the duty cycle period. In decision block 550, if there is time remaining for the duty cycling event, then the component loops back to block 510 to continue modulating the setpoint, else processing of the component completes. Although in this example the setpoint is adjusted by the offset value every half duty cycle period, one skilled in the art will recognize that the setpoint can be adjusted at different rates to account for user preferences with respect to comfort and energy consumption and conservation. Moreover, the wait time between adjustments may vary throughout the duration of the duty cycling event. For example, wait times determined at block 520 and block 540 may be replaced by non-identical wait times.

Figure 6:
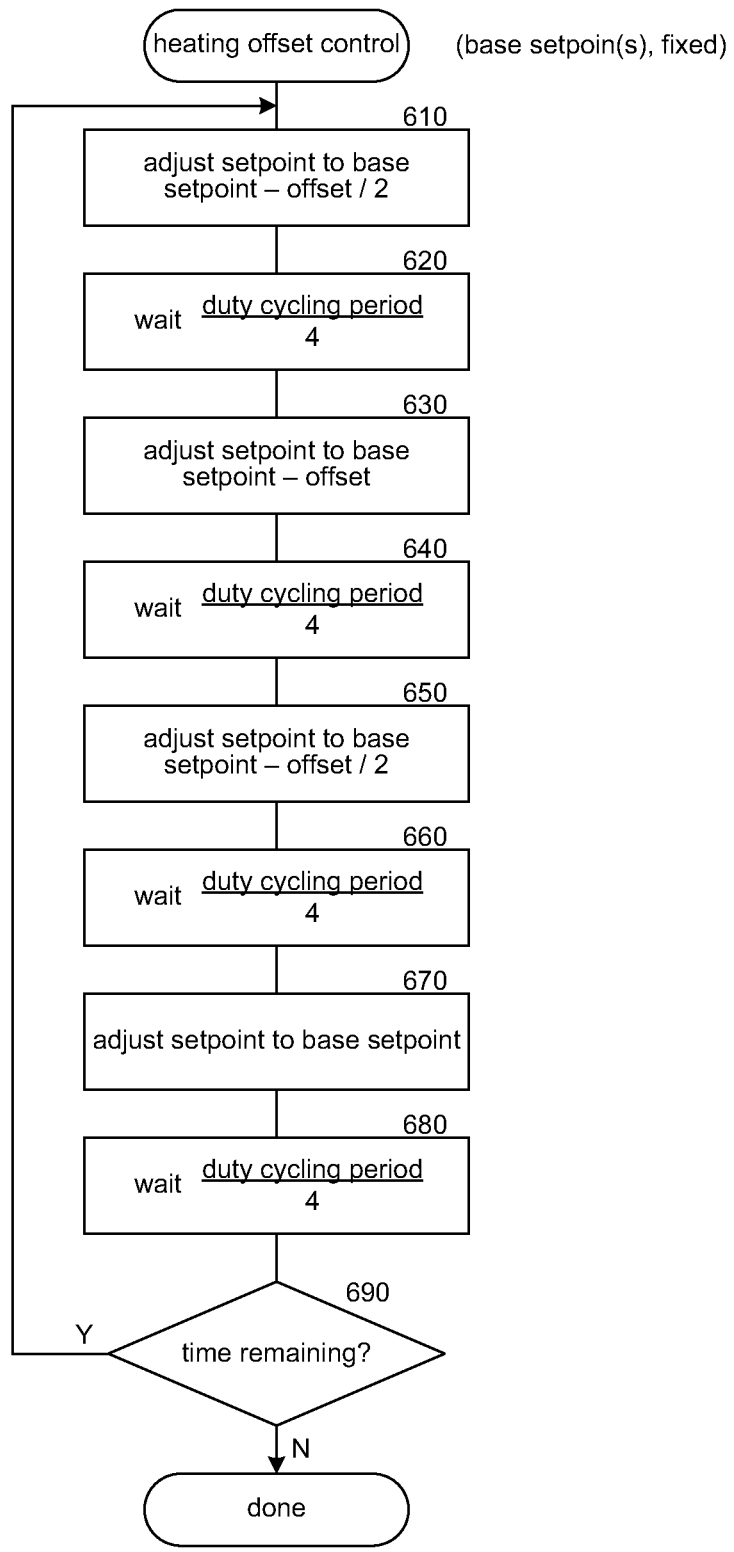
FIG. 6 is a block diagram illustrating the processing of a heating offset control component.

FIG. 6 is a block diagram illustrating the processing of a heating offset control component in some embodiments. The heating offset control component is invoked by an offset control component to modulate a setpoint based on one or more base setpoint values and an offset value while a controlled device is in a heating mode. In this example, the component modulates the setpoint from a base setpoint value to an offset setpoint value by stepping down (or up) to an intermediate setpoint value while transitioning from the offset setpoint value to the base setpoint value (and vice versa) based on fractions of the offset value. In this manner, the setpoint changes are stepped down (or up) slowly to reduce or eliminate any sudden and drastic changes. In block 610, the component adjusts the setpoint to a base setpoint value minus half of the offset value. For example, if the base setpoint value is 72° F. and the offset value is 4° F., then the component would adjust the setpoint to 70° F. (72° F.−2° F.). The component may select from among multiple base setpoint values to comply with any scheduled changes to account for programmed settings, etc. In block 620, the component waits for a quarter of the duty cycle period. For example, if the duty cycle period is 60 minutes, then the component will wait for 15 minutes. In block 630, the component adjusts the setpoint to a base setpoint value minus the offset value. For example, if the base setpoint value is 72° F. and the offset value is 4° F., then the component would adjust the setpoint to 68° F. (72° F.−4° F.). In block 640, the component waits for a quarter of the duty cycle period. In block 650, the component adjusts the setpoint to a base setpoint value minus half of the offset value. In block 660, the component waits for a quarter of the duty cycle period. In block 670, the component adjusts the setpoint to a base setpoint value. As discussed above, if there are multiple base setpoint values, then the component selects appropriate base setpoint values based on an associated setpoint schedule. In decision block 690, if there is time remaining for the duty cycling event, then the component loops back to block 610 to continue modulating the setpoint, else processing of the component completes. Although in this example the setpoint is adjusted by half of the offset value every quarter duty cycle period, one skilled in the art will recognize that the setpoint can be adjusted at different rates to account for user preferences with respect to comfort and energy consumption and conservation. Moreover, the wait time between adjustments may vary throughout the duration of the duty cycling event. For example, the wait times between incremental changes may get longer or shorter with time or as the setpoint values increase or decrease.

Figure 7:
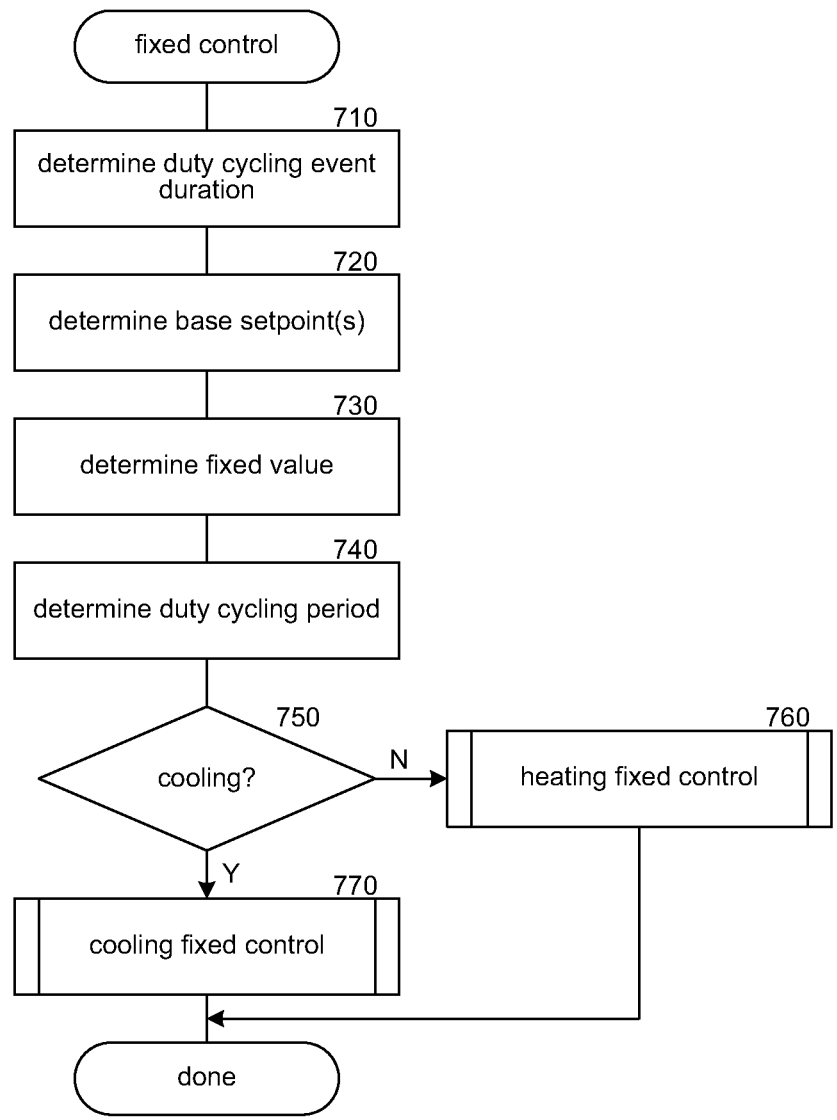
FIG. 7 is a block diagram illustrating the processing of a fixed control component.

FIG. 7 is a block diagram illustrating the processing of a fixed control component in some embodiments. The fixed control component is invoked by a setpoint duty cycling component to modulate a setpoint of a controlled device between one or more base setpoint values and a specified fixed setpoint value. In block 710, the component determines the duration of the duty cycling event based on, for example, specifications of a demand response request. In block 720, the component determines a base setpoint value, such as the current setpoint value of a thermostat. In some embodiments, the component may determine multiple base setpoint values based on a schedule that overlaps with the duty cycling event. In block 730, the component determines a fixed setpoint value to be applied during the duty cycling event. The fixed setpoint value may be stored in and retrieved from the settings stored or may be received with a demand response request. In some cases, the component may query the appropriate utility for fixed setpoint values. In some embodiments, a utility may offer different energy rates for different fixed setpoint values and the component may select a fixed setpoint value based on the user's willingness (or unwillingness) to conserve energy. In some cases, the component may prompt the user to select from a group of fixed setpoint values and associated energy rates (e.g., price per watt) and receive a selection of a fixed setpoint value from the user. The prompt may also include, for each value in the list or group, an indication of the amount of money and/or energy that will be conserved by selecting that value. In block 740, the component determines the period for the duty cycling event. The period of the duty cycling event may be specified by the demand response request or retrieved from the utility. In decision block 750, if the controlled device is in cooling mode, then the component continues at block 770, else the component continues at block 760. In block 760, the component invokes a heating fixed control component and then completes. In block 770, the component invokes a cooling fixed control component and then completes.

Figure 8:
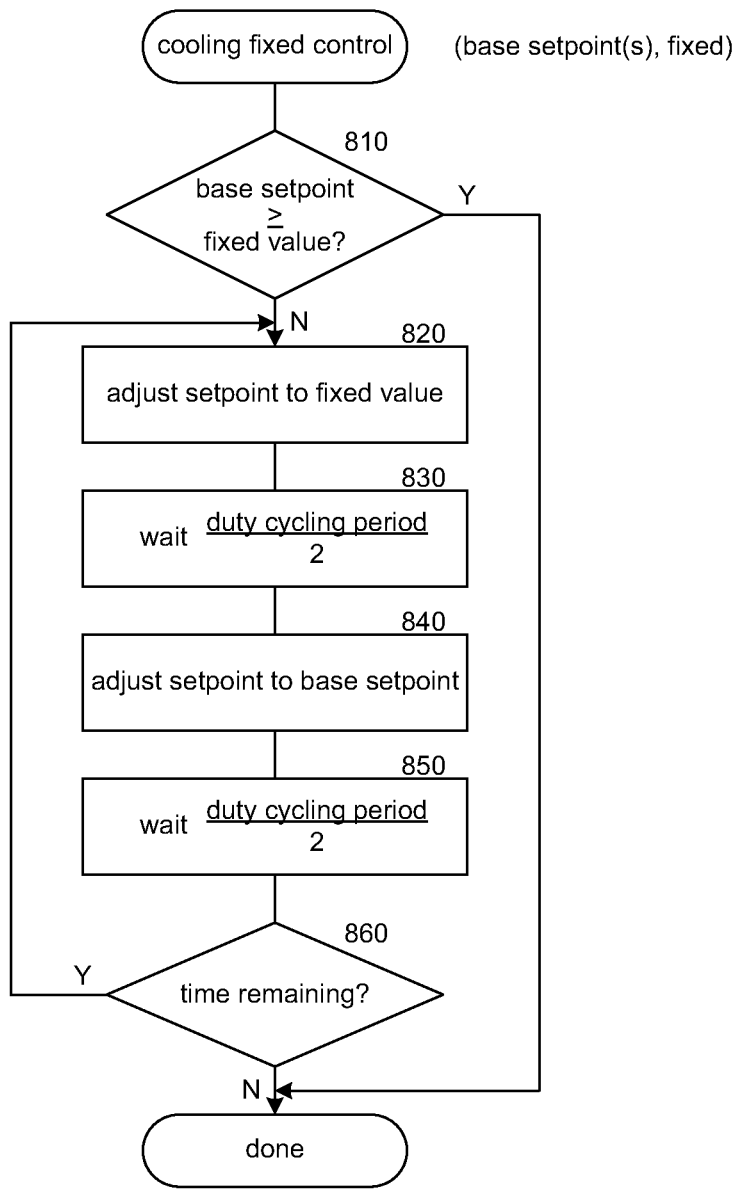
FIG. 8 is a block diagram illustrating the processing of a cooling fixed control component.

FIG. 8 is a block diagram illustrating the processing of a cooling fixed control component in some embodiments. The cooling fixed component is invoked by a fixed control component to modulate a setpoint based on one or more base setpoint values and a fixed setpoint value while a controlled device is in a cooling mode. In decision block 810, if the base setpoint value is greater than or equal to the fixed setpoint value, then the component completes, else the component continues at block 820. If the base setpoint value is already greater than or equal to the fixed setpoint value while in cooling mode, then adjusting to the fixed setpoint value would increase energy consumption. In block 820, the component adjusts the setpoint to the fixed setpoint. In block 830, the component waits for half of the duty cycle period. For example, if the duty cycle period is 90 minutes, then the component will wait for 45 minutes. In block 840, the component adjusts the setpoint to a base setpoint value. The component may select from among multiple base setpoint values to comply with any scheduled changes to account for programmed settings, etc. In block 850, the component waits for half of the duty cycle period. In decision block 860, if there is time remaining for the duty cycling event, then the component loops back to block 810 to continue modulating the setpoint, else processing of the component completes. Although in this example the setpoint is adjusted from a base setpoint value to a fixed setpoint value (or vice versa) every half duty cycle period, one skilled in the art will recognize that the setpoint can be adjusted at different rates to account for user preferences with respect to comfort and energy consumption and conservation. Moreover, the wait time between adjustments may vary throughout the duration of the duty cycling event.

Figure 9:
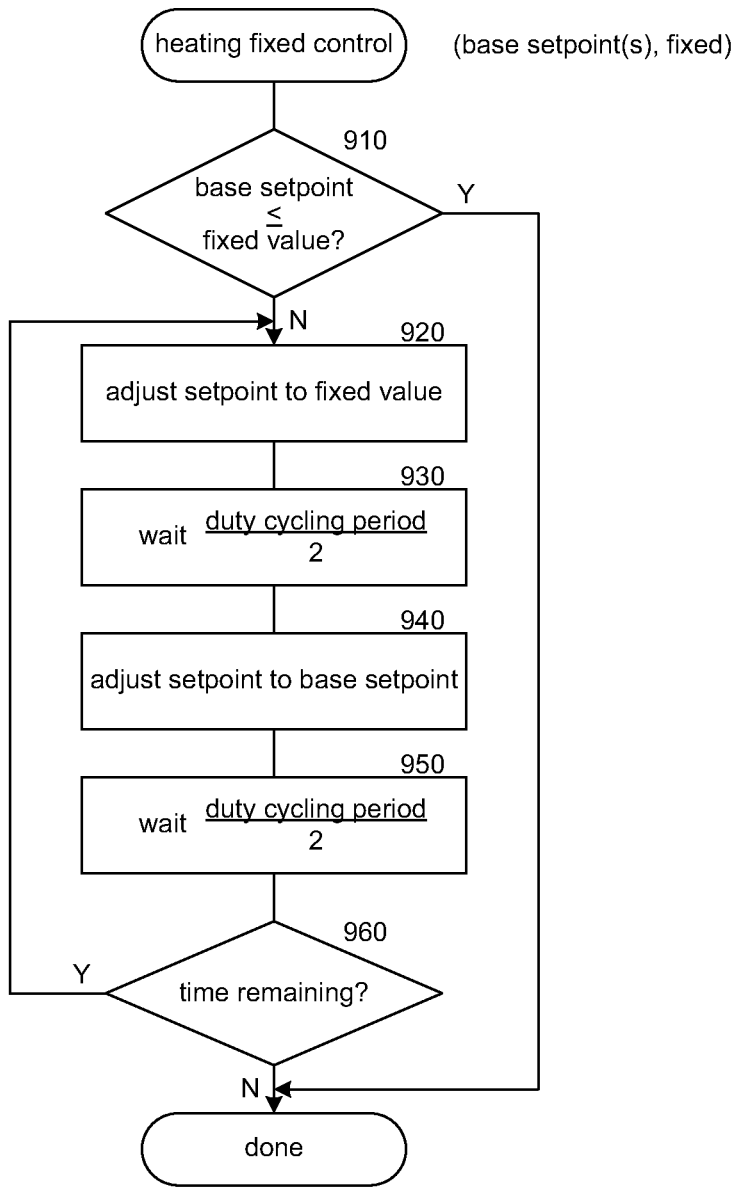
FIG. 9 is a block diagram illustrating the processing of a heating fixed control component.

FIG. 9 is a block diagram illustrating the processing of a heating fixed control component in some embodiments. The heating fixed control component is invoked by a fixed control component to modulate a setpoint based on one or more base setpoint values and a fixed setpoint value while a controlled device is in a heating mode. In decision block 910, if the base setpoint value is less than or equal to the fixed setpoint value, then the component completes, else the component continues at block 920. If the base setpoint value is already less than or equal to the fixed setpoint value while in heating mode, then adjusting to the fixed setpoint value would increase energy consumption. In block 920, the component adjusts the setpoint to the fixed setpoint. In block 930, the component waits for half of the duty cycle period. In block 940, the component adjusts the setpoint to a base setpoint value. The component may select from among multiple base setpoint values to comply with any scheduled changes to account for programmed settings, etc. In block 950, the component waits for half of the duty cycle period. In decision block 960, if there is time remaining for the duty cycling event, then the component loops back to block 910 to continue modulating the setpoint, else processing of the component completes. Although in this example the setpoint is adjusted from a base setpoint value to a fixed setpoint value (or vice versa) every half duty cycle period, one skilled in the art will recognize that the setpoint can be adjusted at different rates to account for user preferences with respect to comfort and energy consumption and conservation. Moreover, the wait time between adjustments may vary throughout the duration of the duty cycling event.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the techniques described above are discussed in conjunction with an HVAC system, the disclosed techniques could be applied to various appliances and systems, such as a water heater, washer and dryer, dishwasher, battery charger (such as a car battery charger), and so on. In some cases, a controlled device may specify maximum and minimum offset values and fixed setpoint values to maintain certain safety and comfort standards. Accordingly, the invention is not limited except as by the appended claims.

I claim:

1. A method, performed by a system having a processor, for conserving energy by performing setpoint-based duty cycling of a heating, ventilation, and air conditioning (HVAC) system of a building, the method comprising:

storing a plurality of base setpoint values for a thermostat associated with the HVAC system;

receiving an indication of a duty cycling event, the duty cycling event having an associated period;

determining whether the duty cycling event is an offset-based duty cycling event;

in response to determining that the duty cycling event is an offset-based duty cycling event, determining a first offset value for the duty cycling event, determining whether the HVAC system is in cooling mode, in response to determining that the HVAC system is in cooling mode, determining a first offset setpoint value based at least in part on one of the plurality of base setpoint values and the first offset value, adjusting a setpoint of the thermostat associated with the HVAC system to the first offset setpoint value, determining a first wait time based at least in part on the associated period of the duty cycling event, and after waiting for at least the first wait time, adjusting the setpoint of the thermostat associated with the HVAC system to one of the plurality of base setpoint values, and in response to determining that the HVAC system is not in cooling mode, determining a second offset setpoint value based at least in part on one of the plurality of base setpoint values and the first offset value, adjusting the setpoint of the thermostat associated with the HVAC system to the second offset setpoint value, determining a second wait time based at least in part on the associated period of the duty cycling event, and after waiting for at least the second wait time, adjusting the setpoint of the thermostat associated with the HVAC system to one of the plurality of base setpoint values; and in response to determining that the duty cycling event is not an offset-based duty cycling event, receiving an indication of a fixed setpoint value, adjusting the setpoint of the thermostat associated with the HVAC system to the fixed setpoint value, determining a third wait time based at least in part on the associated period of the duty cycling event, and after waiting for at least the third wait time, adjusting the setpoint of the thermostat associated with the HVAC system to one of the plurality of base setpoint values.

2. The method of claim 1, wherein the plurality of base setpoint values are associated with a setpoint schedule and wherein each of the plurality of base setpoint values has an associated start time.

3. The method of claim 1, wherein the indication of the duty cycling event is received from a utility as part of a demand response request.

4. The method of claim 1, wherein determining the first offset setpoint value comprises determining the sum of a base setpoint value and the first offset value.

5. The method of claim 1, wherein determining the second offset setpoint value comprises determining the difference between a base setpoint value and the first offset value.

6. The method of claim 1, wherein determining the first offset setpoint value comprises determining the sum of a base setpoint value and a fraction of the first offset value.

7. The method of claim 1, wherein determining the second offset setpoint value comprises determining the difference between a base setpoint value and a fraction of the first offset value.

8. A system for regulating a controlled device, the system comprising:

a first component configured to identify a base setpoint value for the controlled device;

a second component configured to receive an indication of a duty cycling event, the duty cycling event having a duration and an offset value;

a third component configured to define an offset setpoint value for the controlled device based at least in part on the base setpoint value and the offset value associated with the duty cycling event; and a fourth component configured to modulate a setpoint of the controlled device between the base setpoint value and the offset setpoint value over the duration of the duty cycling event.

9. The system of claim 8, further comprising:

a fifth component configured to determine whether the controlled device is in a heating mode or a cooling mode.

10. The system of claim 9 wherein the third component is configured to determine the offset setpoint value based on the sum of the base setpoint value and the offset value in response to the fifth component determining that the controlled device is in a cooling mode.

11. The system of claim 9, wherein the third component is configured to determine the offset setpoint value based on the difference between the base setpoint value and the offset value in response to the fifth component determining that the controlled device is in a heating mode.

12. The system of claim 8 wherein the fourth component is configured to adjust the setpoint of the controlled device at intervals equal to half of a period associated with the duty cycling event.

13. The system of claim 8 wherein the fourth component is configured to adjust the setpoint of the controlled device at intervals equal to less than half of a period associated with the duty cycling event.

14. The system of claim 8 wherein the offset value is specified by a utility.

15. The system of claim 8 wherein the offset value is specified by a user.

16. A computer-readable storage medium, that is not a transitory, propagating signal, storing instructions that, if executed by a system, cause the system to perform operations for controlling a controlled device, the operations comprising:

receiving from a user a base setpoint value for a controlled device; and in response to receiving an indication of a duty cycling event specifying a fixed setpoint value, in response to determining that the controlled device is in a cooling mode and the fixed setpoint value is greater than or equal to the base setpoint value, modulating a setpoint of the controlled device between the base setpoint value and the fixed setpoint value, and in response to determining that the controlled device is in a heating mode and the fixed setpoint value is less than or equal to the base setpoint value, modulating the setpoint of the controlled device between the base setpoint value and the fixed setpoint value.

17. The computer-readable storage medium, that is not a transitory, propagating signal, of claim 16, wherein modulating the setpoint of the controlled device between the base setpoint value and the fixed setpoint value comprises:

performing a first adjustment of the setpoint of the controlled device to the fixed setpoint value;

after performing the first adjustment, performing a second adjustment of the setpoint of the controlled device to the base setpoint value;

after performing the second adjustment, performing a third adjustment of the setpoint of the controlled device to the fixed setpoint value; and after performing the third adjustment, performing a fourth adjustment of the setpoint of the controlled device to the base setpoint value.

18. The computer-readable storage medium, that is not a transitory, propagating signal, of claim 17 wherein the adjustments are performed at regular intervals.

19. The computer-readable storage medium, that is not a transitory, propagating signal, of claim 17 wherein the adjustments are performed at varying intervals.

20. A method, performed by a heating, ventilation, and air conditioning (HVAC) controller having a memory and a processor, the method comprising:
- identifying, with the HVAC controller, a base setpoint value for a controlled device;
- receiving, with the HVAC controller, an indication of a duty cycling event, the duty cycling event having a duration and an offset value;
- defining, with the HVAC controller, an offset setpoint value for the controlled device based at least in part on the base setpoint value and the offset value associated with the duty cycling event; and
- modulating, with the HVAC controller, a setpoint of the controlled device between the base setpoint value and the offset setpoint value over the duration of the duty cycling event.

* * * * *